June 21, 1927.

A. HALIKMAN 1,633,407

ANTISPLASH DEVICE FOR STORAGE BATTERIES

Filed May 11, 1926

INVENTOR
Abraham Halikman.
BY
ATTORNEYS

Patented June 21, 1927.

UNITED STATES PATENT OFFICE.

ABRAHAM HALIKMAN, OF NEW YORK, N. Y.

ANTISPLASH DEVICE FOR STORAGE BATTERIES.

Application filed May 11, 1926. Serial No. 108,357.

This invention relates to an antisplashing device for storage batteries and has for an object to provide a construction which may be readily applied and removed and which will prevent the splashing or boiling over of storage batteries when the same are being charged.

Another object is to provide a device to be used as a substitute for the closure plugs of storage batteries, the device being so formed as to prevent splashing when carrying the storage battery a short distance and also to prevent the storage battery from boiling over when being charged at too great a rate.

In the accompanying drawing—

Figure 1:
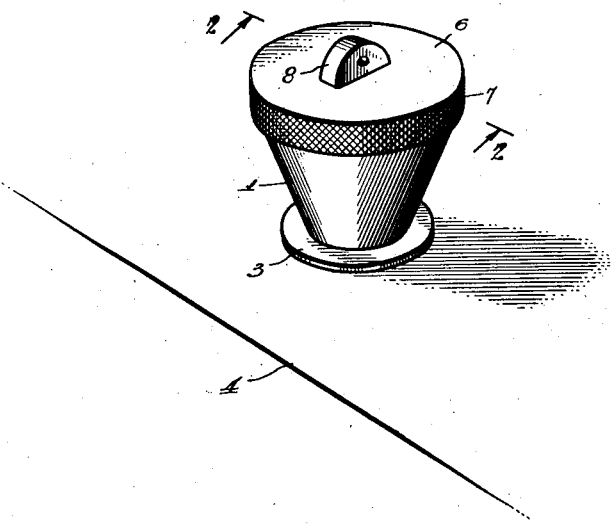
Figure 1 is a perspective view showing part of a storage battery with a device embodying the invention applied thereto.

In the use of storage batteries, the same must be charged from time to time and new liquid must be supplied also from time to time. All storage batteries, therefore, have some form of opening for receiving the liquid and these openings are usually threaded for receiving closure plugs. When the plug is removed, which must be done in charging, the liquid oftentimes boils or splashes over, particularly when the battery is being charged at too great a rate. Also where batteries are charged at home, as for instance, batteries used in radio apparatus, it is sometimes found desirable to transport the battery from place to place with the plug removed and this sometimes causes a splashing over of the liquid.

To obviate this splashing when carrying or when charging, a member 1 is provided which is in the nature of a container having a threaded tubular lower end 2 adapted to be screwed into the threaded opening 3 of the storage battery 4. The container 1 is shown as tapering but it is evident that the same could be square, round or other shape provided it had a member 2. Preferably, an externally threaded section 5 is also formed with chamber 1 so as to receive the closure plug 6 which has an internally threaded flange 7 and a projection 8 acting as a hand hold. When the closure plug or cap 6 is used, the same is removed during the charging and after the charging has been completed, the plug is again placed in position as shown in Figure 2.

Figure 2:
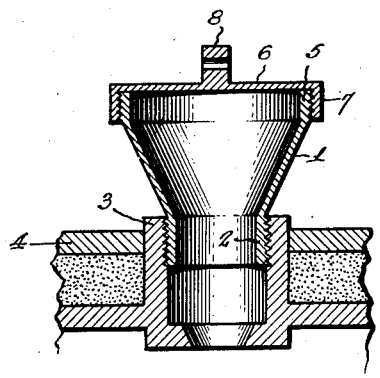
Figure 2 is a fragmentary sectional view through Figure 1, approximately on line 2—2.
Figure 3:
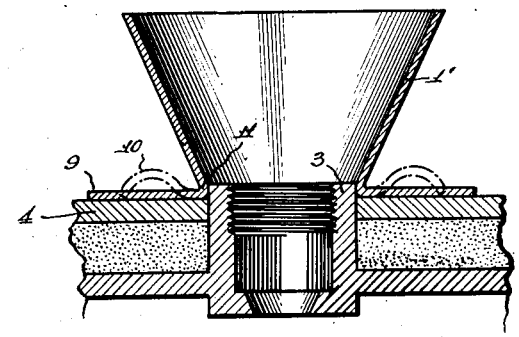
Figure 3 is a view similar to Figure 2 but showing a modified form of the invention.

Under some circumstances it may not be desirable to use the construction shown in Figure 2 and when this is the case, the antisplashing container 1' may be used, said container merging into a flexible base 9 which is normally cupped as shown by the dotted lines 10. After the device has been placed in position so that the end portion 11 fits around the projecting tubular member 3 forming the opening in the battery, base 9 is collapsed so as to substantially fit flatwise against the upper surface of the battery and be held in place under the action of suction or rarefaction. The base 9, as it will be evident, acts in the nature of a suction cup and may be constructed otherwise than shown, provided it acts to hold the container 1' in place. Any splashing over of the liquid in the battery will be caught by the container 1' and will, therefore, automatically return to the battery. After the charging operation has been completed, the container 1' must be removed and the plug substituted in order to prevent evaporation. When using member 1, the same may be made with a threaded tubular lower end 2 as shown in the drawing or may be made with other connections, as for instance, bayonet joints without departing from the spirit of the invention. In addition, where desired, the container 1 could be made permanent or a part of the battery.

What I claim is:—

In a storage battery, a tubular filling member formed with a main bore and a bottom having an opening extending therethrough of an appreciably less diameter than said main bore, said filling member being internally threaded at its outer end, a funnel-shaped container having a tapering portion and an externally threaded cylindrical portion, said cylindrical portion being screwed into the threaded part of said filling member, said funnel-shaped container also being formed at its outer end with a threaded cylindrical section, and a closure cap normally screwed onto said threaded section.

ABRAHAM HALIKMAN.